US011647350B2

(12) United States Patent
Mate et al.

(10) Patent No.: US 11,647,350 B2
(45) Date of Patent: May 9, 2023

(54) AUDIO PROCESSING

(71) Applicant: Nokia Technologies Oy, Espoo (FI)

(72) Inventors: Sujeet Shyamsundar Mate, Tampere (FI); Arto Lehtiniemi, Lempäälä (FI); Jussi Artturi Leppänen, Tampere (FI); Miikka Tapani Vilermo, Siuro (FI)

(73) Assignee: Nokia Technologies Oy, Espoo (FI)

( * ) Notice: Subject to any disclaimer, the term of this patent is extended or adjusted under 35 U.S.C. 154(b) by 53 days.

(21) Appl. No.: 17/410,320

(22) Filed: Aug. 24, 2021

(65) Prior Publication Data

US 2022/0086586 A1 Mar. 17, 2022

(30) Foreign Application Priority Data

Sep. 15, 2020 (EP) .................................... 20196167

(51) Int. Cl.
*H04S 7/00* (2006.01)
*G06T 19/00* (2011.01)
(52) U.S. Cl.
CPC ............ *H04S 7/303* (2013.01); *G06T 19/006* (2013.01); *H04S 2400/11* (2013.01); *H04S 2400/13* (2013.01)
(58) Field of Classification Search
CPC .. H04S 7/303; H04S 2400/11; H04S 2400/13; G06T 19/006; G06F 3/165;
(Continued)

(56) References Cited

U.S. PATENT DOCUMENTS 10,678,340 B2 * 6/2020 West ...................... G02B 27/01
11,099,802 B2 * 8/2021 Eronen ................. G06F 3/1454
(Continued)

FOREIGN PATENT DOCUMENTS

EP 3461149 A1 3/2019
EP 3477466 A1 5/2019
(Continued)

OTHER PUBLICATIONS

Extended European Search Report received for corresponding European Patent Application No. 20196167.9, dated Mar. 10, 2021, 9 pages.

*Primary Examiner* — Motilewa Good-Johnson
(74) *Attorney, Agent, or Firm* — Joseph C. Drish; Harrington & Smith

(57) ABSTRACT

An apparatus, method and computer program is disclosed. The apparatus may comprise means for providing first virtual content for presentation, which first virtual content is associated with a first space and comprises one or more first virtual objects. One of the first virtual objects may comprise one or more virtual objects having respective audio signals and another may represent a miniature representation of a second space into which the user can transition. The miniature representation may have a second scale, smaller or larger than the first scale, and may comprise one or more second virtual objects having respective audio signals audible from outside of the second space. The apparatus may further comprise means for determining whether at least part of the user is within the first space or the second space, and dependent on the determination, modifying the audio signal of one or more of the first or second virtual objects.

23 Claims, 6 Drawing Sheets

(58) Field of Classification Search
CPC ...... G06F 3/012; G06F 3/011; G06F 3/04815; A63F 13/54
See application file for complete search history.

(56) References Cited

U.S. PATENT DOCUMENTS

| | | | |
|---|---|---|---|
| 11,172,320 B1* | 11/2021 | Pelzer | G06T 15/06 |
| 11,197,119 B1* | 12/2021 | Schroeder | G06F 30/13 |
| 11,399,253 B2* | 7/2022 | Aharoni | H04S 7/30 |
| 11,443,487 B2* | 9/2022 | Leppänen | G06T 19/003 |
| 11,450,071 B2* | 9/2022 | Stokking | G06T 7/50 |
| 11,523,243 B2* | 12/2022 | Satongar | G06F 3/165 |
| 2016/0123745 A1* | 5/2016 | Cotier | H04W 4/021 701/467 |
| 2017/0068323 A1* | 3/2017 | West | G06F 3/04815 |
| 2019/0042182 A1* | 2/2019 | Thagadur Shivappa | G06F 3/165 |
| 2019/0116448 A1* | 4/2019 | Schmidt | G06F 3/0346 |
| 2019/0130644 A1* | 5/2019 | Mate | G06T 19/003 |
| 2021/0160647 A1* | 5/2021 | Schmidt | G06F 3/0346 |
| 2021/0258713 A1* | 8/2021 | Tajik | H04S 7/304 |
| 2021/0400094 A1* | 12/2021 | Miller | G06F 3/013 |

FOREIGN PATENT DOCUMENTS

| | | |
|---|---|---|
| EP | 3486749 A1 | 5/2019 |
| EP | 3506080 A1 | 7/2019 |
| WO | 2018/124280 A1 | 7/2018 |

\* cited by examiner

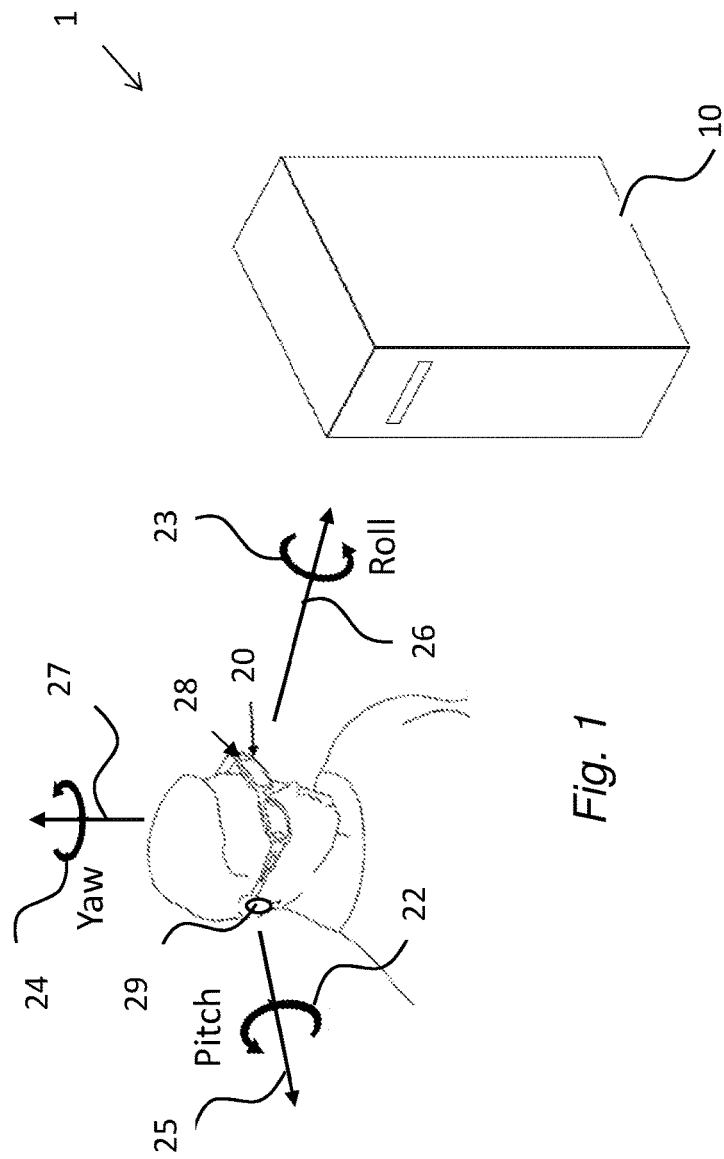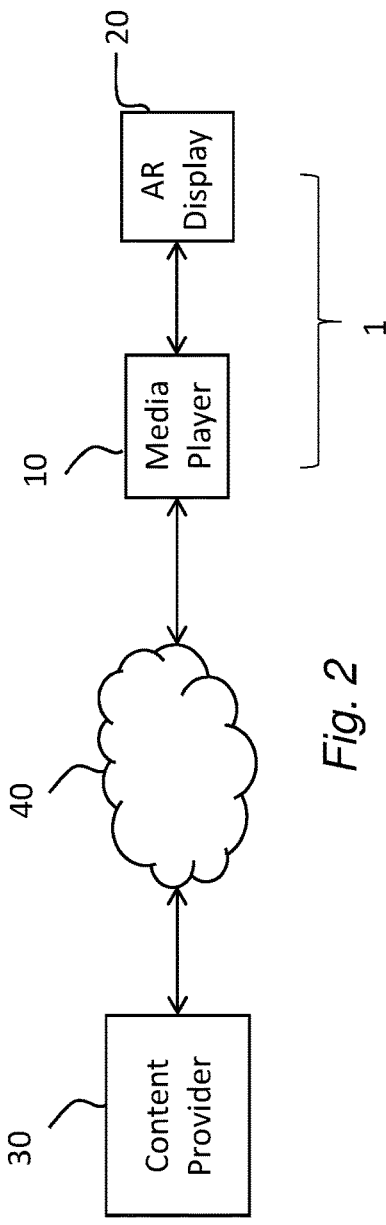

AUDIO PROCESSING

FIELD OF THE INVENTION

This invention relates to audio processing, for example for modifying audio content relating to one or more extended reality (XR) scenes.

BACKGROUND

The term extended reality (XR) is sometimes used to refer to a range of technologies and methods involving real and virtual combined environments. Common examples are virtual reality (VR), augmented reality (AR) and mixed reality (MR). VR may refer to rendering a virtual scene in terms of video and/or audio content, through a VR headset or handheld device, wherein the virtual scene may be updated based on user movement. AR is similar, but involves output of overlaid virtual content to augment a view of the real world seen through glasses, goggles or the camera of a handheld device. Thus, a user of an AR display means may be able to view the real-world environment around them, augmented or supplemented with content that may be provided based on their position. The user may be able to navigate volumetric virtual content with six-degrees-of-freedom (6DOF). The virtual content may comprise multimedia content such as pictures, photographs, video, diagrams, textual information, and/or aural content, to give some examples. Virtual video content may be associated with aural (audio) content that can be heard by a user depending on their position with respect to the virtual video content. Sometimes, audio content may be provided without associated video content.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

A first aspect provides an apparatus comprising means for: providing first virtual content for presentation to a user via a user device, which first virtual content is associated with a first space for user navigation at a first scale based on user position and comprises one or more first virtual objects, one of the first virtual objects comprising one or more virtual objects having respective audio signals and another of the first virtual objects representing a miniature representation of a second space, wherein the second space is a virtual space, into which the user can transition within from the first space, the miniature representation having an associated second scale, smaller or larger than the first scale, for user navigation within the second space and comprising one or more second virtual objects having respective audio signals audible from outside of the second space; determining based on user position whether at least part of the user is within the first space or the second space; and dependent on the determination, modifying the audio signal of one or more of the first or second virtual objects audible from the other one of the first and second spaces such that its or their magnitude is either reduced or increased based on the second scale being respectively smaller or larger than that of the first scale, wherein an amount of magnitude reduction or increase is based at least partly on a scale of the other space.

Responsive to determining that at least part of the user is within the first space, the audio signal of the one or more second virtual objects of the second space may be modified such that their magnitude is scaled down or up by a factor based at least partly on a distance of one or more of said second virtual objects to a virtual space reference position at the second scale.

The magnitude may be reduced or increased by a factor based at least partly on the distance of a single second virtual object to the virtual space reference position. The single second virtual object may be selected as the second virtual object that is nearest to the user position. The virtual space reference position may be on a boundary of the second space.

The magnitude may be reduced or increased by a factor based on (i) the distance of the one or more second virtual objects to the second space reference position at the second scale plus (ii) the distance between the user position and the second space reference position at the first scale.

Responsive to determining that at least part of the user is within the second space, the audio signal of the one or more first virtual objects in the first space may be modified such that its magnitude is reduced or increased based at least in part on (i) the distance between the user position and the one or more first virtual objects in the first space at the first scale and (ii) a second scale multiplier.

The magnitude may be reduced or increased by a factor substantially equal to (i) the distance between the user position and the one or more first virtual objects in the first space at the first scale multiplied by (ii) the second scale multiplier.

Responsive to determining that only part of the user is within the second space, the apparatus may be configured to reduce or increase the magnitude by a smaller amount than if the user was determined to be entirely within the second space.

The apparatus may be configured such that the amount of reduction or increase changes gradually as more of the user is determined to be within the second space.

Responsive to determining that the user is transitioning between the first space and the second space, the apparatus may be configured to modify translational movement perceived by the user via the user device such that the scale of the other space is gradually applied based on how much of the user is within the space to which the user is transitioning.

The first virtual content may comprise augmented or mixed reality content for presentation to a user via the user device.

The first space may be a real-world space.

A second aspect provides a method comprising: providing first virtual content for presentation to a user via a user device, which first virtual content is associated with a first space for user navigation at a first scale based on user position and comprises one or more first virtual objects, one of the first virtual objects comprising one or more virtual objects having respective audio signals and another of the first virtual objects representing a miniature representation of a second space, wherein the second space is a virtual space, into which the user can transition within from the first space, the miniature representation having an associated second scale, smaller or larger than the first scale, for user navigation within the second space and comprising one or more second virtual objects having respective audio signals audible from outside of the second space; determining based on user position whether at least part of the user is within the first space or the second space; and dependent on the determination, modifying the audio signal of one or more of the first or second virtual objects audible from the other one of the first and second spaces such that its or their magnitude is either reduced or increased based on the second scale being respectively smaller or larger than that of the first scale, wherein an amount of magnitude reduction or increase is based at least partly on a scale of the other space.

A third aspect provides a computer program product comprising a set of instructions which, when executed on an apparatus, is configured to cause the apparatus to carry out a method, the method comprising: providing first virtual content for presentation to a user via a user device, which first virtual content is associated with a first space for user navigation at a first scale based on user position and comprises one or more first virtual objects, one of the first virtual objects comprising one or more virtual objects having respective audio signals and another of the first virtual objects representing a miniature representation of a second space, wherein the second space is a virtual space, into which the user can transition within from the first space, the miniature representation having an associated second scale, smaller or larger than the first scale, for user navigation within the second space and comprising one or more second virtual objects having respective audio signals audible from outside of the second space; determining based on user position whether at least part of the user is within the first space or the second space; and dependent on the determination, modifying the audio signal of one or more of the first or second virtual objects audible from the other one of the first and second spaces such that its or their magnitude is either reduced or increased based on the second scale being respectively smaller or larger than that of the first scale, wherein an amount of magnitude reduction or increase is based at least partly on a scale of the other space.

A fourth aspect provides a non-transitory computer readable medium comprising program instructions stored thereon for performing a method, the method comprising: providing first virtual content for presentation to a user via a user device, which first virtual content is associated with a first space for user navigation at a first scale based on user position and comprises one or more first virtual objects, one of the first virtual objects comprising one or more virtual objects having respective audio signals and another of the first virtual objects representing a miniature representation of a second space, wherein the second space is a virtual space, into which the user can transition within from the first space, the miniature representation having an associated second scale, smaller or larger than the first scale, for user navigation within the second space and comprising one or more second virtual objects having respective audio signals audible from outside of the second space; determining based on user position whether at least part of the user is within the first space or the second space; and dependent on the determination, modifying the audio signal of one or more of the first or second virtual objects audible from the other one of the first and second spaces such that its or their magnitude is either reduced or increased based on the second scale being respectively smaller or larger than that of the first scale, wherein an amount of magnitude reduction or increase is based at least partly on a scale of the other space.

A fifth aspect provides an apparatus comprising: at least one processor; and at least one memory including computer program code which, when executed by the at least one processor, causes the apparatus: to provide first virtual content for presentation to a user via a user device, which first virtual content is associated with a first space for user navigation at a first scale based on user position and comprises one or more first virtual objects, one of the first virtual objects comprising one or more virtual objects having respective audio signals and another of the first virtual objects representing a miniature representation of a second space, wherein the second space is a virtual space, into which the user can transition within from the first space, the miniature representation having an associated second scale, smaller or larger than the first scale, for user navigation within the second space and comprising one or more second virtual objects having respective audio signals audible from outside of the second space; to determine based on user position whether at least part of the user is within the first space or the second space; and dependent on the determination, to modify the audio signal of one or more of the first or second virtual objects audible from the other one of the first and second spaces such that its or their magnitude is either reduced or increased based on the second scale being respectively smaller or larger than that of the first scale, wherein an amount of magnitude reduction or increase is based at least partly on a scale of the other space.

BRIEF DESCRIPTION OF THE DRAWINGS

The invention will now be described, by way of non-limiting example, with reference to the accompanying drawings, in which:

FIG. 1 is a perspective view of an extended reality display system;

FIG. 2 is a block diagram of a computer network including the FIG. 1 extended reality display system;

DETAILED DESCRIPTION

Figure 3:
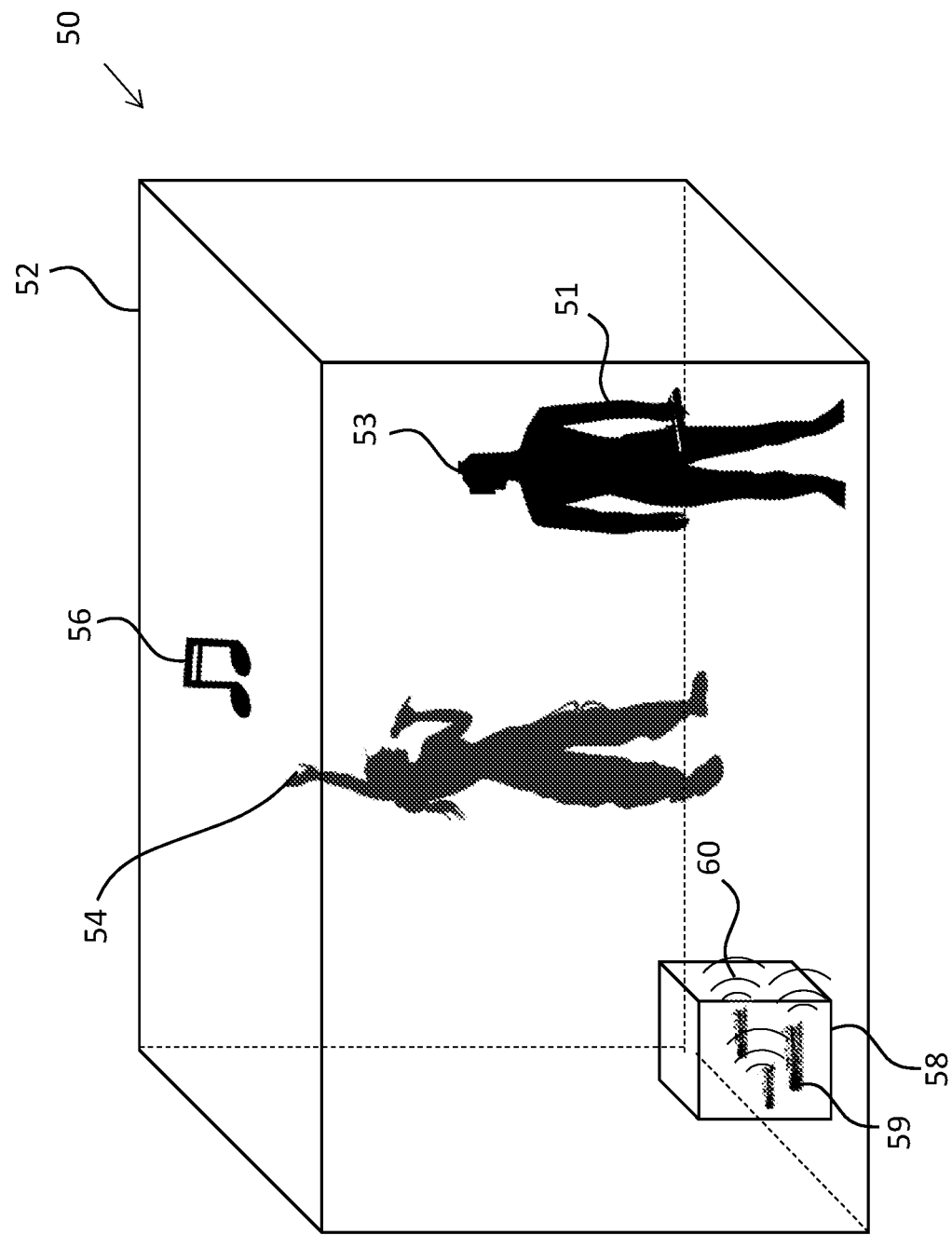
FIG. 3 is a perspective view of a first space comprising a plurality of virtual objects in accordance with an example embodiment.

Example embodiments relate to methods, computer programs and apparatuses relating to extended reality (XR), for example virtual reality (VR), augmented reality (AR) and/or mixed reality (MR).

Example embodiments particularly relate to modification of audio content in situations where a user is presented two or more virtual domains. A virtual domain may be considered a virtual space or world, in which an AR or MR scene overlaid onto a real-world scene is also considered a form of virtual domain for the purposes of this definition.

For example, a first virtual domain may comprise a set of virtual video and/or audio content for being viewed and/or heard as AR or MR when overlaid onto a user's real-world space. In some embodiments, however, the first virtual domain may be a VR domain which may or may not have any reference to a real-world space. As such, references herein to a first space may refer to a real-world space onto which virtual content may be overlaid, or an entirely virtualized space comprised of virtual video and/or audio content without any reference to a real-world space.

A second domain may comprise virtual video and/or audio content for being viewed and/or heard as VR when the user selects to experience the second domain. The second domain may be selected from within the first domain, for example by displaying a miniaturised version of the second domain from within the first domain to allow selection by way of any suitable means, such as by user movement towards or into the miniaturised version, or by one or more gestures or voice commands to enter the second domain.

The miniaturised version of the second domain may therefore be part of the first domain.

In this way, the user can see and/or hear from the first domain at least some of the second domain content and select to transition to the second domain if it appears interesting. For example, upon selection, the second domain may be presented to the user via a user device, as if the user were shrinking into the second domain (or as if the second domain were growing around the user). The transition may be reversible, in the sense that the user may be presented with at least some content from the first domain when in the second domain and may transition back to the first domain using any of the above selection methods.

For ease of explanation, the term augmented reality (AR) will be used hereinafter, but it should be understood that AR is intended also to cover MR and any related technology involving the output of virtual content overlaid either fully or partly onto part of a real-world scene.

Virtual content may comprise multimedia content such as pictures, photographs, video, diagrams, textual information, and audio (or aural) content, to give some examples. The virtual content may be represented in any suitable data format. The virtual content may represent one or more virtual video objects one of more of which may have associated audio content that is perceivable as coming from the general direction of the video object's position. The position of virtual content objects may change over time. Thus, a user may via a user device see an image of a singer overlaid onto the real-world scene and can also hear that 'object' singing or playing an instrument, generally from the same direction. As the user moves within the real-world scene, whether translational movement or rotational movement, the volume and/or direction from where the audio is perceived may change accordingly.

Virtual content may be generated from a captured scene, whether an entire scene or one or more segments of a scene, or may be generated by a designer using an appropriate content creation tool. Virtual video content may be captured using a camera and audio content may also be captured using one or more microphones, e.g. one or more close-up microphones or spatial capture devices, or may be artificially generated using an appropriate audio creation tool.

As mentioned, AR may use an AR display means, for example glasses or goggles having one or more transparent lenses within (or onto) which one or more images may be projected. Another form of AR display means may be a portable computing device, such as a mobile phone or tablet having a camera to capture a viewport of the real world for display in the manner of a lens. An AR apparatus, which may or may not include the AR display means, may provide for presentation of the virtual content to be overlaid over the user's view of the real-world, whether it is seen through a transparent lens or through the camera. Thus, a user of AR may be able to view the real-world environment around them, which is augmented or supplemented with content provided a content provider.

Where aural content is also provided, the content may be output through one or more audio transducers of the AR apparatus, e.g. one or more headphones, earphones, or earbuds which locate on or within the user's ears. If the AR apparatus is a portable computing device such as a mobile phone or tablet, the aural content may be output via a one or more speakers. The speakers need not be mounted on the portable computing device. The audio content may be of any suitable format, including monaural, stereo or spatial. Regarding spatial audio, the audio content may be encoded with a spatial percept which gives an immersive feel as the user, for example, navigates a scene which includes virtual content.

The AR apparatus may also function for VR content.

FIG. 1 is a schematic illustration of an example AR system 1 which represents user-end equipment. The AR system 1 may include a display means in the form of AR glasses 20 having one or more see-through (i.e., transparent) lenses for displaying received video content by overlaying it, e.g. projecting it, onto the one or more lenses using known techniques. The term "lenses" does not necessarily imply any optical correction. The AR glasses 20 can be of any suitable type. As mentioned, a mobile phone or tablet computer may provide the same function using a camera on one side as the lens to provide a real-time image on a display on the other side.

The AR glasses 20 may receive data representing virtual content from a media player 10. In its broadest sense, the media player 10 is a processing means for handling and processing data. The media player 10 may be part of a separate device which is connected to the AR glasses 20 by a wired or wireless connection. For example, the media player 10 may include a games console, PC, laptop, digital assistant, mobile phone or tablet computer. The media player 10 may communicate with the AR glasses 20 using any wired or wireless communications method, for example using WiFi, Bluetooth or similar technologies.

Alternatively, the media player 10 may form part of the AR glasses 20.

Alternatively, the media player 10 may not be part of the user-end equipment, and may be an edge or cloud-based system that provides virtual content direct to the AR glasses 20 over a data network, such as by using cellular communications, e.g. using 3G, LTE, 4G, 5G or any similar future communications technology.

The AR system 1 may also comprise, or be associated with, one or more cameras for capturing static and/or moving images in use. For example, if the AR system 1 includes a mobile phone or tablet computer as the display means, one or more cameras may be provided which act as the lens into the real world. In the case of the AR glasses 20, one or more cameras may be mounted on the AR glasses 20, e.g., in the position indicated by reference numeral 28. Images captured by the one or more cameras 28 may be processed by the AR glasses 20 and/or may be transmitted to the media player 10 for processing.

The AR system 1 may also comprise means for determining the position of a user, for example by determining the position of the AR glasses 20 or the mobile phone or tablet computer. The term "position" may refer to a geographic location which may use global positioning techniques such as GNSS (e.g., GPS), localisation/triangulation via WiFi or cellular base-station signals, but may also refer to position with respect to a reference point and/or an orientation, e.g.

of the user's head, indicative of a field-of-view (FOV). As well as determining where the user may be located in space, over successive time frames a measure of movement may be calculated and stored. Such means may comprise part of the media player 10 and/or part of the AR glasses 20 or mobile phone or tablet computer. For example, the AR glasses 20 or mobile phone or tablet computer may incorporate a GNSS receiver or may even carry a radio location tag detectable by one or more high-accuracy radiolocation readers. The AR glasses 20, mobile phone or tablet computer may comprise one or more motion tracking sensors which may include one or more of gyroscopes, accelerometers and structured light systems. These sensors may generate position data from which a current visual FOV may be determined, and which is updated as the user, and so the AR glasses 20, mobile phone or tablet change position and/or orientation.

Another way of determining position may be through the use of one or more radio tags carried by the user. High accuracy indoor positioning (HAIP) tags are an example technology whereby external readers determine the location of such tags using low-power radio signals.

Another method of determining position may be through the use of one or more sensors or markers carried by the user, the sensors/markers being identified via one or more external radio sensors and/or cameras, e.g. infrared cameras, such that position of the one or more sensors can be determined using, for example, triangulation, structured light or time of flight calculations. For example, a user may carry a plurality of such sensors or markers on respective parts of their body such that the captured image data can be used to identify individual sensor positions in order to estimate more complex postures and gestures based on positions of different body parts.

Such technologies may therefore be used to determine how much (or what proportion) of a user's body corresponds with a particular boundary or reference area.

The AR glasses 20 may comprise two see-through lenses which may incorporate respective digital displays, e.g. LED or OLED displays. Alternatively, the digital displays may be projected to the surface of the lenses, e.g. directly or via a prism, at appropriate positions.

The AR glasses 20 may include a pair of earphones or earbuds 29 (only one of which is seen in FIG. 1) through which audio content associated with virtual content may be heard.

In some embodiments, the AR system 1 may determine the position and/or orientation of the user's head using six degrees of freedom (6DoF). As shown in FIG. 1, in relation to the shown AR glasses 20, these may include measurements of pitch 22, roll 23 and yaw 24 and also translational movement in Euclidean space along side-to-side, front-to-back and up-and-down axes 25, 26, 27. In this way, it is relatively straightforward to determine the user's FOV.

In use, a user wearing the AR glasses 20, or carrying a mobile phone or tablet computer, may move within a real-world space. Depending on their position, virtual content may be displayed as one or more overlays onto the relevant display means (i.e. lens or display screen) to augment the real-world view based on said position. For example, the user may be positioned in a room and first virtual content representing a musician or singer may be represented in one part of the room, e.g. near a far corner. Audio content associated with the musician or singer may emanate from the corresponding position in the room. As the user, and therefore the AR glasses 20, move, the audio content will change, for example in terms of its direction and/or volume or magnitude. For example, if the user moves toward the position of the audio content, then its volume will increase, and vice versa.

The virtual content, whether video and/or aural, may already be stored on the media player 10 or may be retrieved by sending the position information to a remote source of virtual content, i.e. a remote content provider, and then by receiving and displaying the relevant virtual content.

Referring to FIG. 2, a remote content provider 30 may store and transmit virtual content as discrete files or as a packetized or a continuous stream of data which, in the context of example embodiments, is data representing virtual content for AR overlay using the display means, e.g. AR glasses 20. Responsive to receive or download requests sent by the media player 10, the remote content provider 30 sends the virtual content over a data network 40, which may be any network, for example an IP network such as the Internet, or a cellular network.

Referring to FIG. 3, a scenario 50 in accordance with an example embodiment is shown, comprising a user 51 positioned within a real-world space 52, e.g. a room, but it could be any form of real-world space. The user 51 may be free to navigate the real-world space 52 at a first scale in order to explore video and sounds via an AR/VR device 53 depending on his or her position at a particular time. The user 51 may be considered to be within a first virtual domain. As mentioned above, the first domain may alternatively comprise an entirely virtualized domain with no reference to the real-world space 52.

From where the user 51 is positioned, there are two virtual objects 54, 58. A first virtual object 54 may be an AR/VR object having both video content and associated audio content 56 perceivable from the shown position. The video content and associated audio content 56 may comprise separate virtual objects in some embodiments. The second virtual object 58 may represent a miniature version of a larger extended reality (XR) space, e.g. a VR space, being a second, different virtual domain into which the user 51 can transition from the first, real-world space 52. That is, whilst the user 51 will always be in the real-world space 52, there may be a first AR/VR domain comprising the first and second virtual objects 54, 58 and, in this case, a second VR domain comprising other virtual content that the user can experience by selecting, in this example, the second virtual object 58 using any of the above methods. Selection of the second virtual object 58 may enable the user to perceive being immersed into the miniaturised virtual space represented by the second virtual object, as if, from the user's point of view, they perceive themselves to shrink and/or the virtual space to grow around them. Again, the user may be free to navigate the miniaturised virtual space, for example to explore one or more so-called second domain virtual objects 59 that are within that space.

The miniaturised virtual space, being represented by the second virtual object 58 which is part of the first virtual domain, provides an intuitive way in which users can identify and explore other virtual worlds using a common real-world space 52. We may assume that audio content 60 which corresponds to the miniaturised virtual space can be heard via the AR/VR device 53 even though the user is not currently immersed within it. For example, as shown, there may be a plurality of second domain virtual objects 59 visible and/or audible from outside the miniaturised virtual space, acting as visual and/or aural cues which may inform the user 51 about what the miniaturised virtual space represents. If the user 51 transitions to within the miniaturised virtual space, by selection of the second virtual object 58, those objects may appear to grow in relation to the user so that they can explore them at a larger size.

The first scale mentioned above refers to the perceived movement of the user 51 when in the real-world space 52 shown in FIG. 3. This may be referred to as a real-world scale, and may be (but is not necessarily) 1:1 indicating that, for one metre of real-world movement, there is one metre of movement with respect to the first and second virtual objects 54, 58, and also the audio content 56. What is perceived depends on the type and amount of movement, e.g. translational and/or rotational.

The miniaturised virtual space represented by the second virtual object 58 may have a different associated scale, e.g. 1:10. This may be referred to as the miniaturised scale. This may dictate how much perceived movement occurs when the user 51 is immersed within the miniaturised virtual space. A scale of 1:10 means that, for every 1 metre of movement in the real-world space 52 when the user is immersed within the miniaturised virtual space, there will be 0.10 metres of movement with regard to virtual objects 59 within the miniature virtual space. In some example embodiments, the miniaturised virtual space may have a scale larger than the first scale, although the description below mainly assumes that it is smaller.

In some example embodiments, more than one such miniaturised virtual space may be provided, providing multiple selectable domains into which the user may transition.

Example embodiments may involve adapting the audio content, e.g. audio signals, perceived from the domain different from the one the user is currently immersed in. An aim is to avoid the user 51 being distracted or overwhelmed by the other audio content which can detract from the immersive experience and/or make it difficult to make sense of the various domains and their constituent virtual contents.

For example, in the FIG. 3 scenario 50, when the user 51 is outside of the miniature virtual space, the plurality of second domain virtual objects 59 are approximately the same distance from the user 51 and, thus, collectively, their respective audio contents may cause a lot of noise in addition to the audio content 56 of the first virtual object 54. If the user 51 were immersed in the miniaturised virtual space, the respective audio contents would be perceived as spread-out based on the second scale, with the particular second domain virtual object 59 closest to the user 51 being heard with greater magnitude (volume), and so on, based on distance and orientation. However, in the shown scenario, the result may be distracting.

Figure 4:
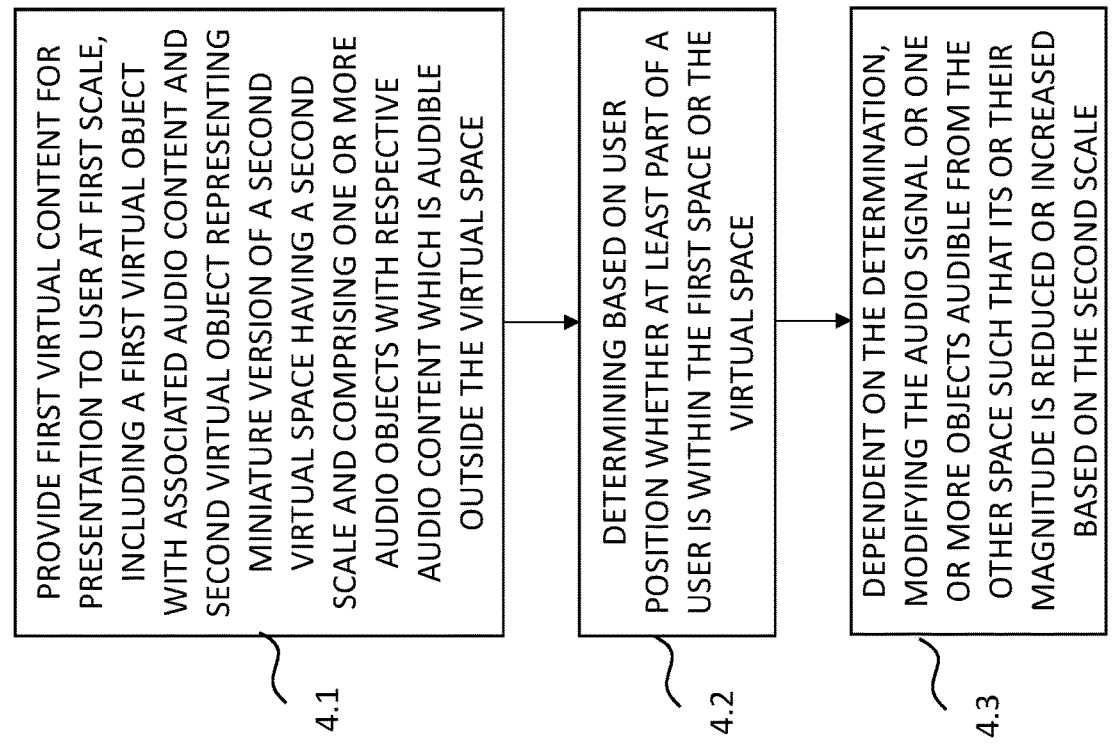
FIG. 4 is a flow diagram of processing operations in accordance with an example embodiment.

FIG. 4 is a flow diagram of processing operations in accordance with an example embodiment. The processing operations may be performed at, for example, the AR/VR device (e.g. AR glasses 20) and/or the media player 10 shown in FIG. 2 or even using processing in the cloud.

An operation 4.1 may comprise providing first virtual content for presentation to a user via a user device, which first virtual content is associated with a first space for user navigation at a first scale based on user position and comprises one or more first virtual objects. One of the first virtual objects may comprise one or more virtual objects having respective audio signals and another of the first virtual objects may represent a miniature representation of a second (i.e. different) space, which is a virtual space, into which the user can transition within from the first space. The miniature representation may have an associated second scale, smaller or larger than the first scale, for user navigation within the second space and comprising one or more second domain virtual objects having respective audio signals audible from outside of the second space.

Where the second scale is smaller than the first scale, it means that the translational movement perceived by the user when navigating the corresponding virtual space is smaller than when the user is navigating the first space. For example, if the first scale is 1:1 and the second scale is 1:10, then the user will perceive 0.1 metres of translational movement in the second virtual space compared with one metre of translational movement in the first space. The value of "10" of the second scale may be referred to as a scale multiplier. In some example aspects, the second scale may also refer to how much smaller the second virtual objects appear in the miniature representation (as perceived from the first space) compared with the first virtual objects in the first space. Where the second scale is greater than the first scale, e.g. 10:1, the opposite situation applies.

An operation 4.2 may comprise determining based on user position whether at least part of the user is within the real-world space or the virtual space.

An operation 4.3 may comprise, dependent on the determination, modifying the audio signal of one or more of the virtual objects audible from the other space of the first and second spaces (i.e. the other space from that which the user is determined to be within) such that its or their magnitude is reduced or increased based on the second scale. If the second scale is smaller than the first scale, the magnitude is reduced and vice versa. The amount of magnitude reduction or increase may be based at least partly on the scale of the other space.

The above operations relate to reducing or increasing the magnitude of audio objects in the other space than that which the user is currently immersed-in or navigating. For example, a user navigating the first space will therefore hear the second audio objects associated with the miniaturised virtual space at a lower volume if the second scale is smaller than the first scale.

The order of operations is not necessarily indicative of a required order of processing. One or more further operations may be performed. Some operations may be performed substantially in parallel.

As a consequence, in the case of the second scale being smaller than the first scale, by reducing magnitude (e.g. perceived volume) of one or more objects in the other domain, or space or world, comprising virtual objects, those objects appear further away and hence adverse effects are avoided or mitigated. Where the second scale is larger than the first scale, the magnitude of the one or more objects in the other domain may be amplified. For the sake of brevity, it will be assumed in the following that the second scale is smaller than the first scale and, hence, magnitude reduction is the result, but it should be appreciated that the reverse situation can apply if the second scale is larger than the first.

Taking the FIG. 3 scenario 50, therefore, the one or more second domain virtual objects 59 may have their audio magnitude reduced based at least in part on the miniaturised scale, e.g. 1:10.

To give a basic example, each second domain virtual object 59 of the second domain virtual space may have its audio magnitude scaled down by a factor of ten.

In some example embodiments, the audio signal of the one or more second domain virtual objects 59 of the second domain virtual space may be modified such that their magnitude is scaled down by a factor based at least partly on the distance of one or more of said second domain virtual objects to a virtual space reference position at the second scale.

Figure 5:
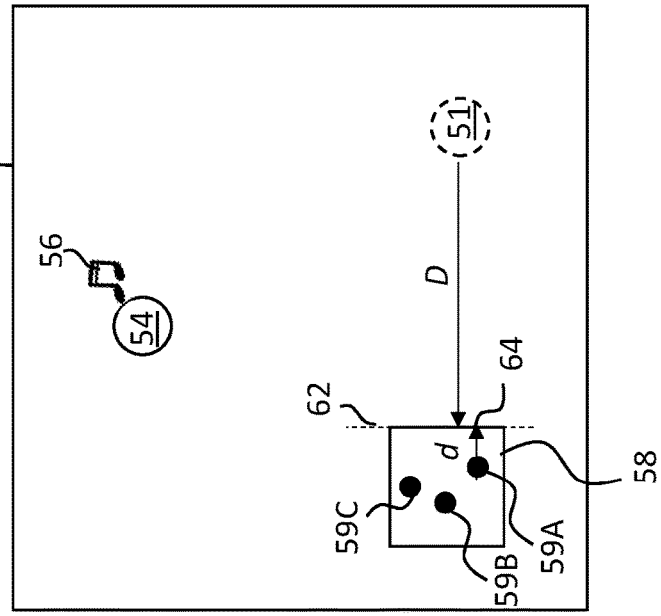
FIG. 5 is a top-plan view of the FIG. 3 first space illustrative of a first scenario.

For example, FIG. 5 is a top-plan view of the FIG. 3 scenario 50.

The miniaturised virtual space is shown to comprise three second domain virtual objects 59A-59C which have corresponding audio content. The three second domain virtual objects 59A-59C may be spatially-separate trains, for example, but could represent any form of content. In some embodiments, the three second domain virtual objects 59A-59C may move over time. The user 51 is shown outside of the miniaturised virtual space and hence is exploring the real-world space 52. The user 51 perceives the audio content 56 from the first virtual object 54, the magnitude of which is based on the distance between the user 51 and said audio content 56 at the first, real-world scale. The user 51 also perceives the audio content from the three second domain virtual objects 59A-59C which are, relatively speaking, approximately the same distance from the user 51. The user 51 is assumed to be D metres from a boundary line 62 of the miniature virtual space. For example, D may be 5 metres.

In accordance with some example embodiments, a distance d may be determined within the miniaturised virtual space for use in determining how much to reduce the audio magnitude of one or more of the three second domain virtual objects 59A-59C. For example, the distance d may be that between a single one of the three second domain virtual objects 59A-59C and a virtual space reference position. In the shown example, we consider the second domain virtual object 59A which is nearest to the user 51. The virtual space reference position may be, for example, a position 64 on the boundary line 62 of the miniaturised virtual space in the horizontal (x) direction towards the user 51. The virtual space reference position 64 could however be a mid-point of the boundary line 62 in the y direction, a centroid of the miniaturised virtual space or a particular corner of miniaturised virtual space.

To determine how much to reduce the magnitude of the one or more second domain virtual objects 59A-59C, the distance d may be scaled according to the miniaturised scale, e.g. 1:10, and hence a distance d of 0.8 metres at the real-world scale becomes eight metres using "10" as a scale multiplier.

Thus, in one example, the magnitude of the audio signal from at least the nearest second domain virtual object 59A may be scaled down at least partly on the basis that it is eight metres from the boundary line 62 based on the miniaturised scale. The audio magnitude may be scaled down by a factor of eight, for example, to give the impression that the nearest second domain virtual object 59A is about eight times further away.

In some embodiments, the distance D may also be taken into account. For example, if D=five metres, the magnitude of the audio signal from at least the nearest second domain virtual object 59A may be scaled down by a factor of thirteen.

In some embodiments, multiple values of d for each of the first to third second domain virtual objects 59A-59C may be determined and each may have their audio magnitude scaled down individually. Alternatively, only a single one of the second domain virtual objects, e.g. the nearest one 59A, may be used in the determination and the same scaling is applied to the others 59B, 59C.

The scaling of the audio magnitudes, whether to decrease or increase, may be done in linear or logarithmic domains or using any other method that mimics audio attenuation or amplification over distances.

As mentioned, the effect is to dynamically adjust the respective audio magnitudes of the one or more second domain virtual objects 59A-59C in the miniaturised virtual space. The effect of audio magnitude reduction is to make them sound further away and avoids or mitigates the aforementioned distracting effects, while retaining the perception of distance based attenuation (audio object 59A will sound slightly louder than 59B).

Figure 6:
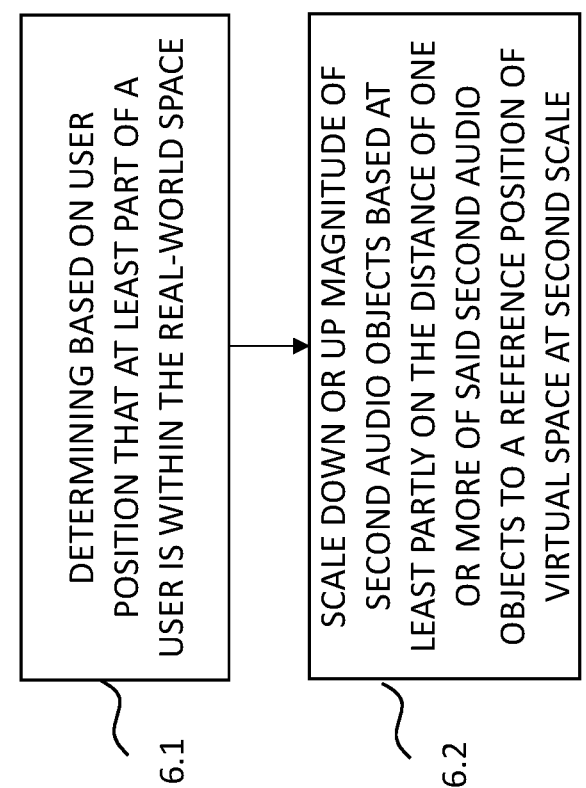
FIG. 6 is a flow diagram of processing operations in accordance with an example embodiment associated the first scenario.

FIG. 6 is a flow diagram of processing operations in accordance with an example embodiment in which the user 51 is within the real-world space 52. The processing operations may be performed at, for example, the AR/VR device (e.g. AR glasses 20) and/or the media player 10 shown in FIG. 2 or even using processing in the cloud.

An operation 6.1 may comprise determining based on the user position that at least part of the user 51 is within the real-world space.

An operation 6.2 may comprise scaling down or up the magnitude of the one or more second virtual objects based at least partly on the distance of one or more of said second virtual objects to a virtual space reference position at the second scale.

The order of operations is not necessarily indicative of a required order of processing. One or more further operations may be performed. Some operations may be performed substantially in parallel.

Figure 7:
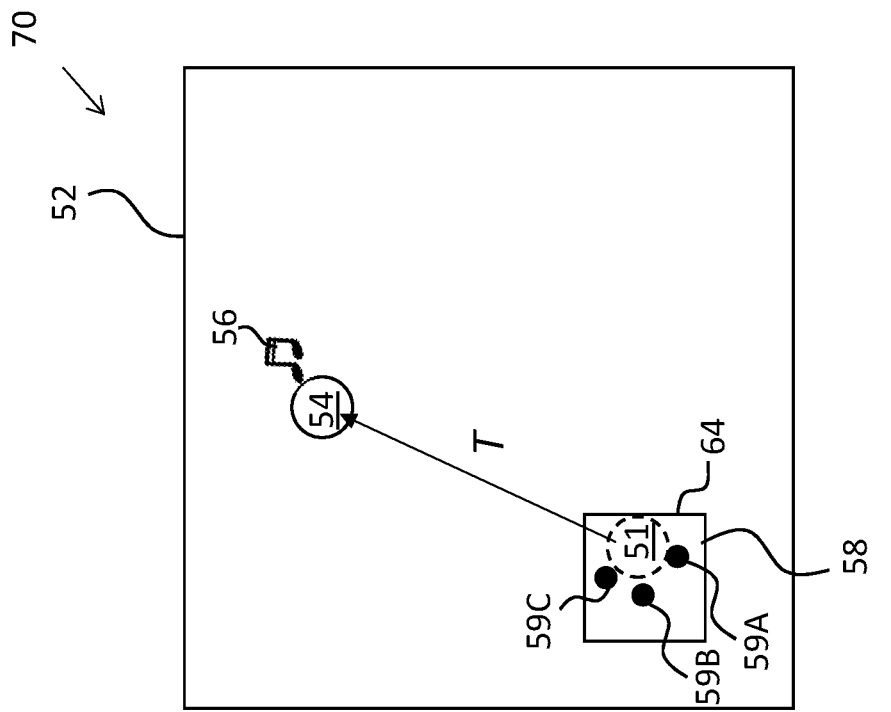
FIG. 7 is a top-plan view of the FIG. 3 first space illustrative of a second scenario.

Referring to FIG. 7, the reverse scenario 70 is considered whereby the user 51 has transitioned within the miniaturised virtual space and is presented with video and audio content for the second domain virtual objects 59A-59C. The user 51 may navigate these at the second, miniaturised scale. So, for every one metre traversed by the user 51 in the real-world space 52, the perceived movement in the miniaturised virtual space would be about 0.1 m, assuming a 1:10 miniaturised scale.

In this scenario 70, the user 51 can still hear the audio content 56 associated with the first virtual object 54. This may be disturbing or distracting because in real-world distances, the audio content 56 is still very close.

In some embodiments, therefore, the approach taken is to determine the real-world distance T between the user 51 and the audio content 56, say T=1.5 metres, and then apply the miniature scale multiplier, e.g. ten, assuming a 1:10 miniaturised scale, to get fifteen metres. In other words, the magnitude is reduced by a factor substantially equal to (i) the distance between the user position and the one or more first virtual objects in the first domain space at the first scale multiplied by (ii) the second scale multiplier, which refers to the "10" in the above example. The magnitude of the audio signal corresponding to the audio content 56 may be scaled down by a factor of fifteen to make it sound further away.

In some embodiments, rather than the distance T being taken from between the user 51 and the audio content 56, some other reference point may be used.

As regards values of d, D and T, the values and scales mentioned are approximate. The determination of a particular scale multiplier, e.g. ten, may be an integer number thereof, i.e. n*10.

Figure 8:
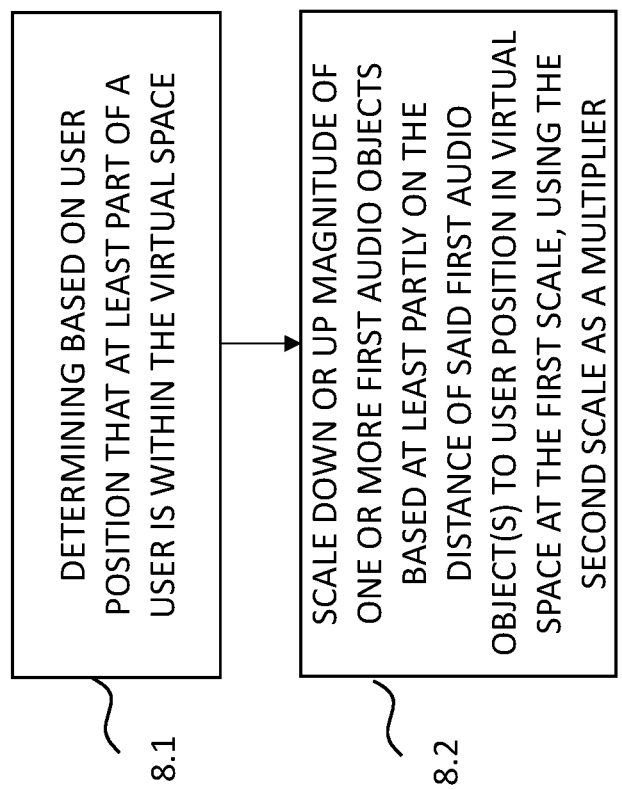
FIG. 8 is a flow diagram of processing operations in accordance with an example embodiment associated with a second scenario.

FIG. 8 is a flow diagram of processing operations in accordance with an example embodiment in which the user 51 is immersed within the miniaturised virtual space. The processing operations may be performed at, for example, the AR device (AR glasses 20) and/or the media player 10 shown in FIG. 2 or even using processing in the cloud.

An operation 8.1 may comprise determining based on the user position that at least part of the user 51 is within the miniaturised virtual space.

An operation 8.2 may comprise scaling down or up the magnitude of the one or more first virtual objects based at least partly on the distance of one or more of said first virtual objects to the user position at the first scale, using the second scale as a multiplier.

The order of operations is not necessarily indicative of a required order of processing. One or more further operations may be performed. Some operations may be performed substantially in parallel.

The above operations may be performed for each of a plurality of first virtual objects, if present outside of the miniaturised virtual space.

Figure 9:
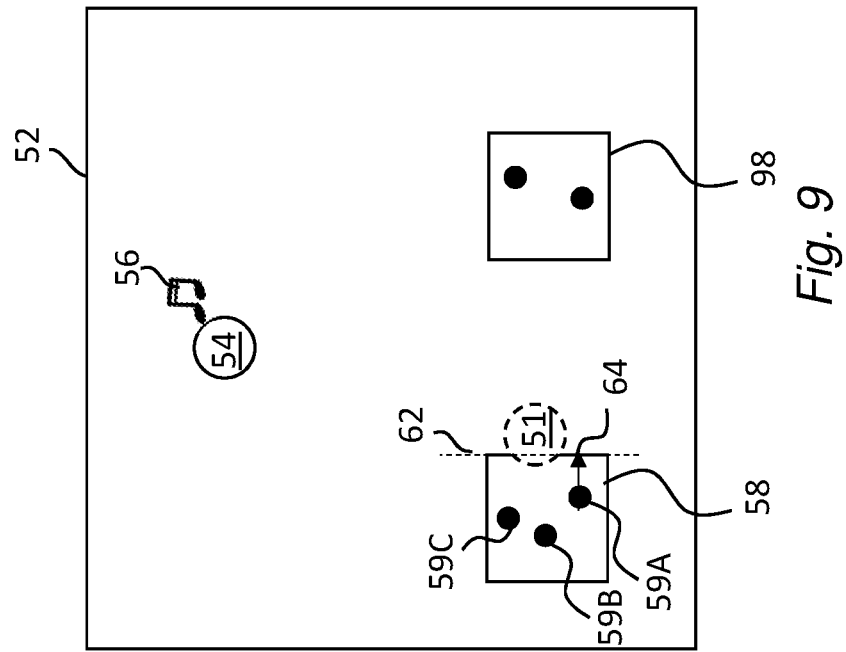
FIG. 9 is a top-plan view of the FIG. 3 first space illustrative of a third scenario.

In some example embodiments, it is possible for the user 51 to be only partly within both the real-world space 52 and the miniaturised virtual space, that is partly within the real-world space 52 and partly within the miniaturised virtual space. As mentioned above, through the use of various positioning techniques, e.g. involving radio tags, sensors, and/or markers carried by different parts of a user's body, a more accurate determination as to how far the user 51 is within either space can be made. For example, a user 51 may wish to 'sample' or 'preview' what is within the miniaturised virtual space by moving only their head within said miniaturised virtual space, and then making a decision as to whether to enter fully or not. The remainder of their body can be determined as still outside. The situation is indicated in the FIG. 9 top plan view, whereby, in addition to the above-mentioned second virtual object 58 representing a miniaturised virtual space, at least one other second virtual object 98 representing another miniaturised virtual space is also shown for being previewed by the user 51.

In this situation, the above-mentioned modifications to the audio content 56, and the second domain virtual objects 59A-59C are still applied to make them sound further away, but the scaling is graduated based on how much of the user 51 is actually within the real-world space 52 and the miniaturised virtual space. In other words, responsive to determining that only part of the user 51 is within, or has transitioned to be within, the second miniaturised virtual space, example embodiments may reduce the magnitude by a smaller amount than if the user was determined to be entirely within the miniaturised virtual space. So, the more the user 51 moves inside the miniaturised virtual space, the more quiet the first audio content 56 gets. The graduation may be smooth and linear, but not necessarily so. It may be step-wise or logarithmic. When the user 51 is completely within the miniaturised virtual space, the first audio content 56 may have its magnitude scaled down fully, or, in some cases, even muted, to indicate full immersion.

The same principle may be applied when the user partly transitions from the miniaturised virtual world (as the start point) to the real-world space 52.

In some example embodiments, such graduation may similarly be applied to the magnitude of perceived movement when a user is partly within the real-world space 52 and partly within the miniaturised virtual space. As mentioned, when immersed in the miniaturised virtual space, the user 51 may navigate the second domain virtual objects 59A-59C at the miniaturised scale. So, for every one metre traversed by the user 51 in the real-world space 52, the perceived movement in the miniaturised virtual space would be about 0.1 m, assuming a 1:10 miniaturised scale. This shift in perceived motion could be disturbing for some users, and so example embodiments are provided to make the transition more gradual and less abrupt.

In the event that only a part of the user 51 is within the miniaturised virtual space, the shift in perceived movement due to the scale differences changes gradually. The perceived movement change may be smooth and linear, or step-wise. For example, for each 'part' (e.g. two centimetre fraction) of the user 51 being inside the miniaturised virtual space, the scaling may reduce by 10% from the first scale. So, initially, one metre traversed by the user 51 in the real-world may translate to 0.9 m of movement in the miniaturised virtual space, then 0.8 m and so on. Alternatively, the scaling reduction may not be linear, e.g. first 0.9 m, then 0.6 m, then 0.1 m.

In some example embodiments, where the user 51 is represented by an avatar, the avatar size may change the scaling of audio propagation or movement speed as described herein, particularly in cases where the avatar size is somewhat different from the user size. In some embodiments, it may be the avatar size and not the user size that determines how much of the 'user' is inside the miniature virtual space for the above purposes.

Figure 10:
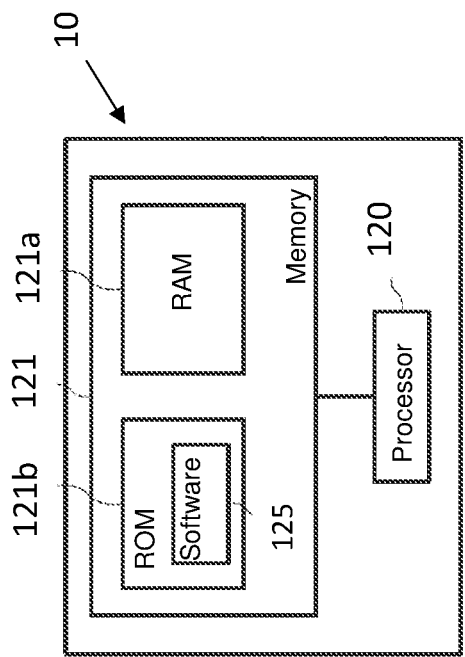
FIG. 10 shows an apparatus in accordance with an example embodiment.

FIG. 10 shows an apparatus according to an embodiment, which may comprise the media player 10 as described herein. The apparatus may be configured to perform the operations described herein, for example operations described with reference to any preceding process. The apparatus comprises at least one processor 120 and at least one memory 121 directly or closely connected to the processor. The memory 121 includes at least one random access memory (RAM) 121a and at least one read-only memory (ROM) 121b. Computer program code (software) 125 is stored in the ROM 121b. The apparatus may be connected to a transmitter (TX) and a receiver (RX). The apparatus may, optionally, be connected with a user interface (UI) for instructing the apparatus and/or for outputting data. The at least one processor 120, with the at least one memory 121 and the computer program code 125 are arranged to cause the apparatus to at least perform at least the method according to any preceding process by executing the computer program code. The at least one processor 120 may be in communication with the AR glasses, goggles, mobile phone or tablet computer described herein.

Figure 11:
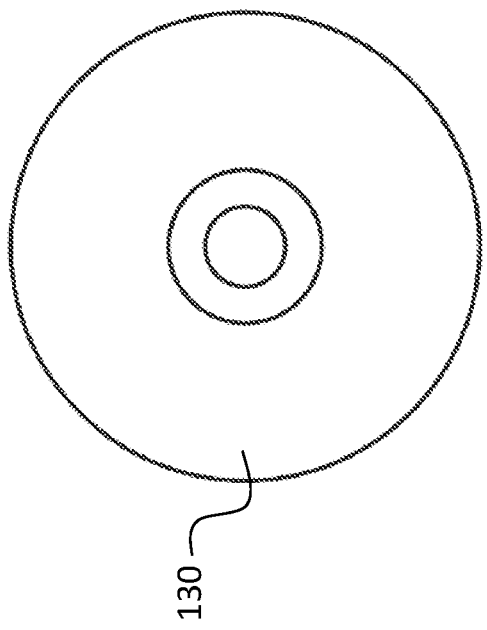
FIG. 11 shows a non-transitory media in accordance with an example embodiment.

FIG. 11 shows a non-transitory media 130 according to some embodiments. The non-transitory media 130 is a computer readable storage medium. It may be e.g. a CD, a DVD, a USB stick, a blue ray disk, etc. The non-transitory media 130 stores computer program code, causing an apparatus to perform the method of any preceding process by the apparatus executing the computer program code.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/ or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures.

The invention claimed is:

1. An apparatus comprising:
   at least one processor; and
   at least one non-transitory memory storing instructions that, when executed by the at least one processor, cause the apparatus to perform at least to:
   provide first virtual content for presentation to a user via a user device, wherein the first virtual content is associated with a first space for user navigation at a first scale based on user position and comprises one or more first virtual objects, at least one of the first virtual objects comprising one or more virtual objects having respective audio signals and at least another one of the first virtual objects representing a representation of a second space smaller than another representation of the second space, wherein the second space is a virtual space, into which the user can transition from the first space, the representation of the second space having an associated second scale, smaller or larger than the first scale, for user navigation within the second space and comprising one or more second virtual objects having respective audio signals audible from outside of the second space, the one or more second virtual objects and respective audio signals of the second space corresponding to respectively different objects and audio signals than the one or more first virtual objects and respective audio signals of the first space;
   determine based on user position whether at least part of the user is within the first space or within the second space; and
   dependent on the determination, modify a volume of the respective audio signal of one or more of the first virtual objects of the first space audible from the second space, or the second virtual objects of the second space audible from the first space, such that the magnitude of the volume of the respective audio signal of the one or more of the first virtual objects or the second virtual objects is either reduced or increased based on the second scale being respectively smaller or larger than that of the first scale, wherein an amount of magnitude reduction or magnitude increase of the volume of the respective audio signal is based at least partly on a scale of the other space, and based at least partly on whether the user is navigating at least partially within a boundary of the first space or a boundary of the second space.

2. The apparatus of claim 1, wherein responsive to determining that at least part of the user is within the first space, the audio signal of the one or more second virtual objects of the second space are modified such that their magnitude is scaled down or up by a factor based at least partly on a distance of one or more of said second virtual objects to a virtual space reference position at the second scale.

3. The apparatus of claim 2, wherein the magnitude is reduced or increased by a factor based at least partly on the distance of a single second virtual object to the virtual space reference position.

4. The apparatus of claim 3, wherein the single second virtual object is selected as the second virtual object that is nearest to the user position.

5. The apparatus of claim 3, wherein the magnitude is reduced or increased by a factor based on the distance of the one or more second virtual objects to the second space reference position at the second scale plus the distance between the user position and the second space reference position at the first scale.

6. The apparatus of claim 2, wherein the virtual space reference position is on a boundary of the second space.

7. The apparatus of claim 1, wherein responsive to determining that at least part of the user is within the second space, the audio signal of the one or more first virtual objects in the first space is modified such that its magnitude is reduced or increased based at least in part on the distance between the user position and the one or more first virtual objects in the first space at the first scale and a second scale multiplier.

8. The apparatus of claim 7, wherein the magnitude is reduced or increased by a factor substantially equal to the distance between the user position and the one or more first virtual objects in the first space at the first scale multiplied by the second scale multiplier.

9. The apparatus of claim 7, wherein responsive to determining that only part of the user is within the second space, the apparatus is configured to reduce or increase the magnitude by a smaller amount than if the user was determined to be entirely within the second space.

10. The apparatus of claim 9 wherein the apparatus is configured such that the amount of reduction or increase changes gradually as more of the user is determined to be within the second space.

11. The apparatus of claim 1, wherein responsive to determining that the user is transitioning between the first space and the second space, the apparatus is configured to modify translational movement perceived by the user via the user device such that the scale of the other space is gradually applied based on how much of the user is within the space to which the user is transitioning.

12. The apparatus of claim 1, wherein the first virtual content comprises augmented or mixed reality content for presentation to a user via the user device.

13. The apparatus of claim 1, wherein the first space is a real-world space.

14. The apparatus of claim 1, wherein the representation of the second space comprises a representation of the second space.

15. The apparatus of claim 1, wherein the respective audio signal of the one or more first virtual objects of the first space is audible from the second space while the user is at least partially immersed within the boundary of the second space, and wherein the respective audio signal of the one or more second virtual objects of the second space is audible from the first space while the user is at least partially immersed within the boundary of the first space.

16. The apparatus of claim 1, wherein the first scale is such that for every unit of movement of the user within the first space, there is a first corresponding unit of movement with respect to the one or more first virtual objects of the first space, and the second scale is such that for every unit of movement of the user within the first space when the user is immersed within the second space, there is a second corresponding unit of movement with respect to the one or more second virtual objects of the second space.

17. A method comprising:
providing first virtual content for presentation to a user via a user device, wherein the first virtual content is associated with a first space for user navigation at a first scale based on user position and comprises one or more first virtual objects, at least one of the first virtual objects comprising one or more virtual objects having respective audio signals and at least another one of the first virtual objects representing a representation of a second space smaller than another representation of the second space, wherein the second space is a virtual space, into which the user can transition from the first space, the representation of the second space having an associated second scale, smaller or larger than the first scale, for user navigation within the second space and comprising one or more second virtual objects having respective audio signals audible from outside of the second space, the one or more second virtual objects and respective audio signals of the second space corresponding to respectively different objects and audio signals than the one or more first virtual objects and respective audio signals of the first space;
determining based on user position whether at least part of the user is within the first space or the second space; and
dependent on the determination, modifying a volume of the respective audio signal of one or more of the first virtual objects of the first space audible from the second space, or the second virtual objects of the second space audible from the first space, such that the magnitude of the volume of the respective audio signal of the one or more of the first virtual objects or the second virtual objects is either reduced or increased based on the second scale being respectively smaller or larger than that of the first scale, wherein an amount of magnitude reduction or magnitude increase of the volume of the respective audio signal is based at least partly on a scale of the other space, and based at least partly on whether the user is navigating at least partially within a boundary of the first space or a boundary of the second space.

18. The method of claim 17, wherein responsive to determining that at least part of the user is within the first space, the audio signal of the one or more second virtual objects of the second space are modified such that their magnitude is scaled down or up by a factor based at least partly on a distance of one or more of said second virtual objects to a virtual space reference position at the second scale.

19. The method of claim 18, wherein the magnitude is reduced or increased by a factor based at least partly on the distance of a single second virtual object to the virtual space reference position.

20. The method of claim 19, wherein the single second virtual object is selected as the second virtual object that is nearest to the user position.

21. The method of claim 18, wherein the virtual space reference position is on a boundary of the second space.

22. The method of claim 19, wherein the magnitude is reduced or increased by a factor based on the distance of the one or more second virtual objects to the second space reference position at the second scale plus the distance between the user position and the second space reference position at the first scale.

23. A non-transitory computer readable medium comprising program instructions stored thereon for performing at least:

providing first virtual content for presentation to a user via a user device, wherein the first virtual content is associated with a first space for user navigation at a first scale based on user position and comprises one or more first virtual objects, at least one of the first virtual objects comprising one or more virtual objects having respective audio signals and at least another one of the first virtual objects representing a representation of a second space smaller than another representation of the second space, wherein the second space is a virtual space, into which the user can transition within from the first space, the representation of the second space having an associated second scale, smaller or larger than the first scale, for user navigation within the second space and comprising one or more second virtual objects having respective audio signals audible from outside of the second space, the one or more second virtual objects and respective audio signals of the second space corresponding to respectively different objects and audio signals than the one or more first virtual objects and respective audio signals of the first space;

determining based on user position whether at least part of the user is within the first space or the second space; and dependent on the determination, modifying a volume of the respective audio signal of one or more of the first virtual objects of the first space audible from the second space, or the second virtual objects of the second space audible from the first space, such that the magnitude of the volume of the respective audio signal of the one or more of the first virtual objects or the second virtual objects is either reduced or increased based on the second scale being respectively smaller or larger than that of the first scale, wherein an amount of magnitude reduction or magnitude increase of the volume of the respective audio signal is based at least partly on a scale of the other space, and based at least partly on whether the user is navigating at least partially within a boundary of the first space or a boundary of the second space.

* * * * *